United States Patent [19]
Hyuga

[11] Patent Number: 5,818,733
[45] Date of Patent: Oct. 6, 1998

[54] COMMUNICATION METHOD AND SYSTEM FOR SAME

[76] Inventor: Makoto Hyuga, 25-58, Misumi-cho 2-chome, Higashimurayama-shi, Tokyo 189, Japan

[21] Appl. No.: 454,285

[22] PCT Filed: Jul. 1, 1994

[86] PCT No.: PCT/JP94/01074

§ 371 Date: Jun. 16, 1996

§ 102(e) Date: Jun. 16, 1996

[87] PCT Pub. No.: WO96/01539

PCT Pub. Date: Jan. 18, 1996

[51] Int. Cl.$^6$ .................................................. G06F 17/00
[52] U.S. Cl. ............................................................ 364/550
[58] Field of Search ..................... 364/514 R, 705.07, 364/550; 340/825.45, 825.19, 825.36, 531, 536, 574; 348/77, 159

[56] References Cited

U.S. PATENT DOCUMENTS

| | | | |
|---|---|---|---|
| 4,511,886 | 4/1985 | Rodriguez | 340/574 |
| 4,581,647 | 4/1986 | Vye | 358/210 |
| 4,611,198 | 9/1986 | Levinson et al. | 340/536 |
| 4,998,095 | 3/1991 | Shields | 340/574 |
| 5,184,824 | 2/1993 | Riedinger | 273/176 A |
| 5,365,217 | 11/1994 | Toner | 340/536 |
| 5,546,072 | 8/1996 | Creueremee et al. | 340/574 |

FOREIGN PATENT DOCUMENTS

| | | |
|---|---|---|
| 62-163489 | 7/1987 | Japan . |
| 4-327832 | 11/1992 | Japan . |
| 0527673 | 2/1993 | Japan . |
| 2125597 | 3/1984 | United Kingdom .............. 340/825.45 |

*Primary Examiner*—Ellis B. Ramirez
*Attorney, Agent, or Firm*—Morrison Law Firm

[57] ABSTRACT

When emergency button (11) of mobile unit (1) of a person who has suddenly fallen ill or other emergency, locational signals representing its own location and ID data are transmitted to receiver (21) of management unit (2) installed in the caddie master's office or at other locations. Based on the locational signals from receiver (21), camera controller component (26) selects camera $(27_1)$~$(27_n)$, $(27_c)$ and controls panning and tilting of the selected camera, thereby adjusting its angle. Signals representing pictures taken by camera $(27_1)$~$(27_n)$, $(27_c)$ are received by visual image receiver component (28) and, together with vocal signals received from voice communication device (16) through voice communication device (24), transmitted from relay device (25) through a public circuit to visual image receiver component (32) and voice communication device (31) of remote unit (3). By operating the dial or push buttons of voice communication device (31), panning and tilting of camera $(27_1)$~$(27_n)$, $(27_c)$ are controlled in order to adjust its angle, and vocal signals are transmitted from voice communication device (31) to mobile unit (1).

15 Claims, 10 Drawing Sheets

COMMUNICATION METHOD AND SYSTEM FOR SAME

BACKGROUND OF THE INVENTION

This invention relates to a method and system for communication of data including visual images taken by an imaging device.

Conventionally, various systems for remotely controlling an imaging device in its focusing and imaging functions such as panning and tilting, and transmitting pictures obtained by said remote control through a communication means are widely known.

Also known to those skilled in the art are a system disclosed in Japanese Patent Laying-open No. 191133/1988 which calls for transmitting signals from a transmitting means attached to a subject to be photographed and taking photographs of this subject upon receiving these signals using a receiving means; another disclosed in Japanese Utility Model Laying-open No. 117625/1989 which calls for taking visual images of a subject by means of receiving signals transmitted from a transmitting means attached to the subject and causing an imaging device to follow the direction of the strongest signal, and another disclosed in Japanese Patent Laying-open No. 134351/1981 which calls for following a subject using a transmitting means attached to the subject and, shooting for a specified period of time.

However, the aforementioned system which controls performance of an imaging device by remote control is capable of receiving visual data signals only by manually changing the settings of the imaging device, and the configurations according to Japanese Patent Laying-open No. 191133/1988 and Japanese Utility Model Laying-open No. 117625/1989 merely call for causing an imaging device to follow a subject to take visual images thereof. Therefore, none is capable of fully utilizing the pictures taken.

Further, in case of an emergency, for example, if conditions of a patient or his situation can be visually presented, it would help a doctor, who may be at a hospital or another remotely located facility in making an appropriate decision that might save the patient's life. For such a reason, there exists a need for a system which is capable of easily transmitting visual images of a specific subject to the doctor in such a case as above.

OBJECTS AND SUMMARY OF THE INVENTION

In order to solve the problems in the prior art, an object of the invention is to provide a communication method and system for transmitting visual images which have been taken by an imaging device and sent by a sender to the receiving party through a relay station.

A method according to the invention calls for transmitting signals representing the voice of a sender; receiving the vocal signals from the sender at a relay station; controlling imaging functions of an imaging device to take pictures of the sender; transmitting the vocal signals from the sender together with the visual images of same, which have been taken by the imaging device, from the relay station to a receiving party; and transmitting vocal signals of the receiving party through the relay station to the sender. Therefore, as the invention is capable of transmitting visual images of the sender to the receiving party through the relay station and allowing 2-way voice communications between the sender and the receiving party through the relay station, the receiving party is able to easily obtain visual images of the sender, and both parties can easily communicate with each other.

According to another feature thereof, the invention calls for transmitting data for the location of the sender so that the locational data is received and used to control the performance of the imaging device. Therefore, according to the invention, it is easy to know the location of the sender of the signals and take his picture with an imaging device.

According to yet another feature of the invention, the receiving party controls the direction in which the imaging device is pointed. Therefore, it is easy for the receiving party to obtain desired pictures.

According to yet another feature of the invention, physical conditions of a subject are monitored; and the relay station transmits the data of his physical conditions to the receiving party together with his pictures taken by the imaging device. With the configuration as above, the receiving party is able to easily obtain data of physical conditions of the subject and, therefore, is ensured of knowing the subject's conditions with visual images of same.

According to yet another feature thereof, the invention calls for storing data of normal conditions of a subject; and transmitting the normal condition data together with the aforementioned data of his physical conditions to the receiving party. With the configuration as above, the receiving party is able to assess the physical conditions of the subject referring to his normal conditions, thereby more reliably judging his current condition.

Furthermore, according to yet another feature of the invention, the invention is provided with one or more mobile units, each of which has a mobile unit transmitting/receiving means for transmitting and receiving vocal signals; a remote unit which has a remote unit transmitting/receiving means for transmitting and receiving vocal signals as well as receiving visual signals, the remote unit also having an image display means for displaying visual images; one or more imaging devices; and a management unit which has an imaging device controlling means for controlling the imaging function of the picture-taking devices, and a relay means for relaying communication between the aforementioned mobile unit transmitting/receiving means and remote unit transmitting/receiving means. With the configuration as above, the remote is capable of receiving signals representing visual images of a subject taken by imaging devices, and voice communication is possible between the remote unit and the mobile unit.

According to yet another feature of the invention, the remote unit is provided with picture-taking directing means for directing the manner of performance of the imaging devices. With the configuration as above, which permits the remote unit to easily direct how pictures of a subject are to be taken, it is easy for the user of the remote unit to obtain desired pictures.

According to yet another feature thereof, the invention is provided with a physical condition monitoring means for monitoring the physical condition of a subject; and the mobile unit transmitting/receiving means of each mobile unit is capable of transmitting the physical condition data through the relay station to the remote unit transmitting/receiving means. With the configuration as above, the user of the remote unit is able to easily obtain data concerning the physical condition of the subject and, therefore, is ensured of knowing the subject's condition with visual images of same.

According to yet another feature thereof, the invention is provided with a physical condition storage means for storing data of normal condition of a subject; and a relay means to transmit the normal condition data together with the aforementioned data of his physical condition to the remote unit transmitting/receiving means. With the configuration as above, the user of the remote unit is able to assess the physical condition of the subject in the context of his normal condition, thereby more reliably judging his current condition.

According to yet another feature thereof, the invention is provided with an image composite means for combining visual images of a subject taken by an imaging device with data of his physical condition which has been monitored by the physical condition monitoring means. With the configuration as above, it is easy for the user of the remote unit to know the status of the subject and data of his physical condition by way of looking at the pictures.

According to yet another feature of the invention, each mobile unit is provided with an extracting means to extract data for its own location; the mobile unit transmitting/receiving means transmits the locational information extracted by the extracting means to the relay means; the management unit is provided with a receiving means to receive said locational information from the mobile unit; and the imaging device controlling means controls performance of the imaging devices based on the locational information received as above. With the configuration as above, it is easy to know the location of the sender and selectively control the appropriate imaging devices with the imaging device controlling means.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Next, a communication system according to an embodiment of the present invention is explained hereunder, referring to the drawings, where the communication system is utilized on a golf course.

Figure 1:
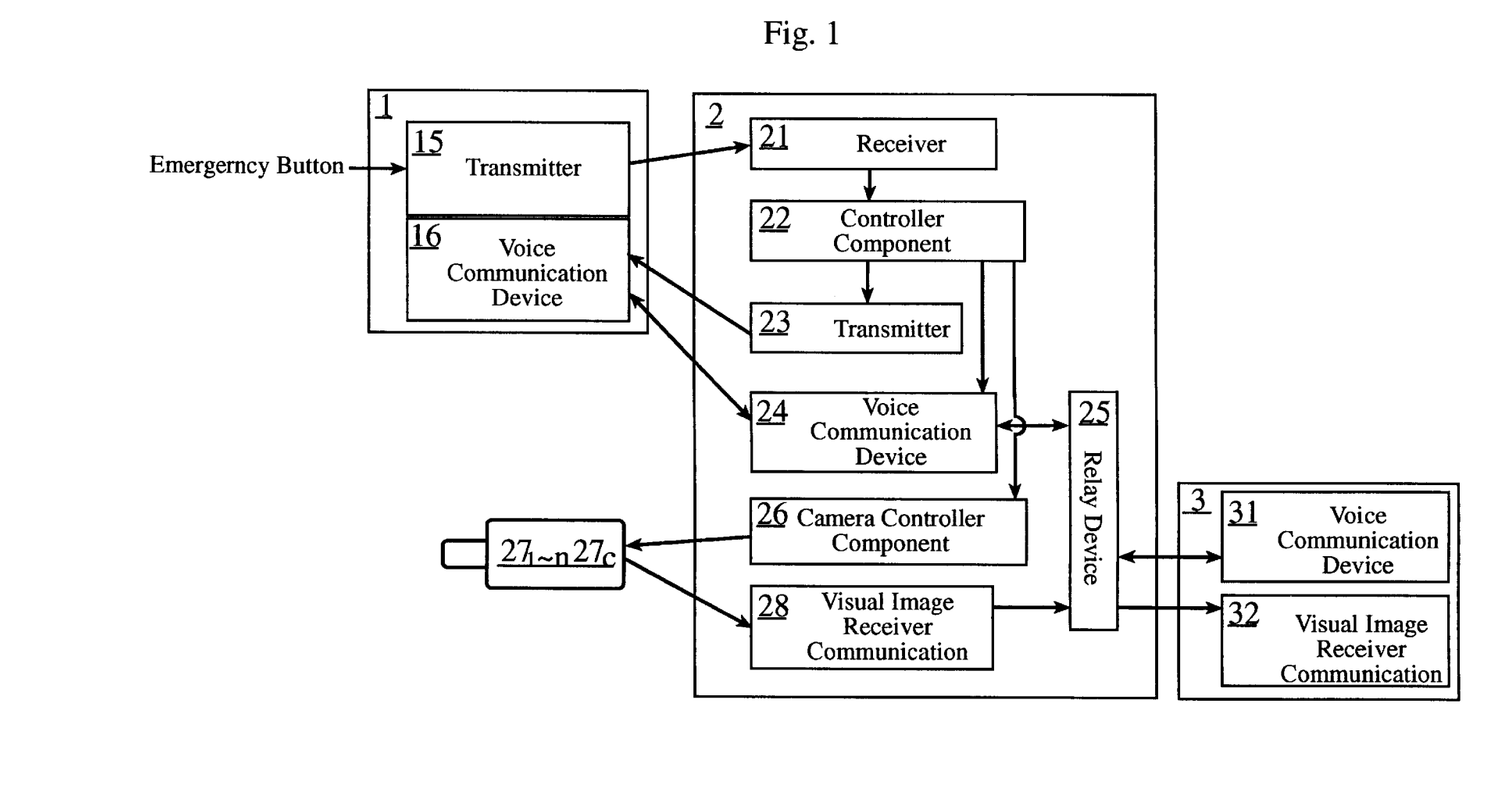
FIG. 1 is a block diagram illustrating a communication system according to an embodiment of the present invention.

Referring to FIG. 1, numeral 1 denotes a mobile unit which is in the possession of each player or caddie. Each mobile unit 1 is capable of communicating through a wireless means, such as radio waves, with management unit 2, which is installed in a clubhouse and serves as a relay station. Through ISDN or public lines, such as a general telephone line, or wireless means, management unit 2 is capable of communicating with a remote unit 3 installed in such facilities as a hospital.

Figure 2:
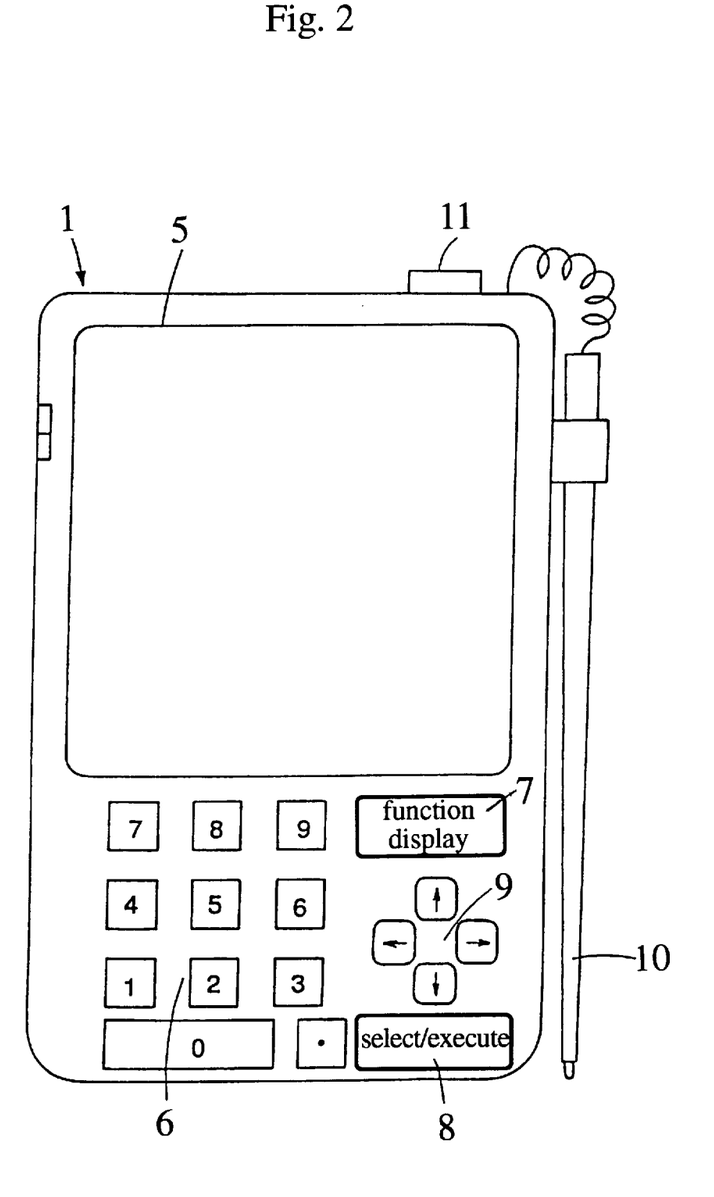
FIG. 2 is a front view of a mobile unit of a communication system according to an embodiment of the present invention.

As shown in FIG. 2, mobile unit 1 is provided with a liquid crystal display 5 to display guidance and other information, a ten-key pad 6 to input scores and so forth, a function display key 7 to display various functions to be performed, a select/execute key 8 and scroll keys 9, as well as a light pen 10 attached to the mobile unit and an emergency button 11 located on the topside of the unit. And as shown in FIG. 1, mobile unit 1 is provided with a transmitter 15 and a voice communication device 16. Transmitter 15, provided with its own identification number, which may be, for example, the personal identification number of the player in possession of the mobile unit 1, and transmits signals revealing its location together with its identification, and as appropriate, notification of an emergency. Mobile unit 1 is also provided with voice communication device 16 having voice communication capability. In addition to the above mentioned functions, mobile unit 1 is also capable of performing such functions as score tabulation, detecting its own location, guidance display, settling accounts and so forth.

Referring again to FIG. 1, management unit 2 is provided with a receiver 21 which receives signals from transmitter 15 of mobile unit 1 either directly or by way of antennae disposed at appropriate locations, and a controller component 22 which executes control commands based on information received from receiver 21. Further, controller component 22 is connected to transmitter 23 which activates voice communication device 16 of a mobile unit 1. In addition, controller component 22 is provided with voice communication device 24 which allows voice communication with voice communication device 16 of mobile unit 1 to occur after voice communication device 16 is activated. Controller component 22 is also connected to a camera controller component 26, which issues commands pertaining to the selection, direction, angle, and when the situation demands, the distance, of each respective imaging devices $27_1$~$27_n$, $27_c$. Further, signals representing visual images from any one of imaging devices $27_1$~$27_n$, $27_c$ are received by visual image receiver component 28, with visual image receiver component 28 and voice communication device 24 being connected to a relay device 25.

Remote unit 3 is provided with a voice communication device 31, which may be a telephone or the like, and a visual image receiver component 32 which may be a monitor.

Voice communication device 31 and visual image receiver component 32 are connected to relay device 25 of management unit 2 by such means as the aforementioned public transmission lines.

Figure 3:
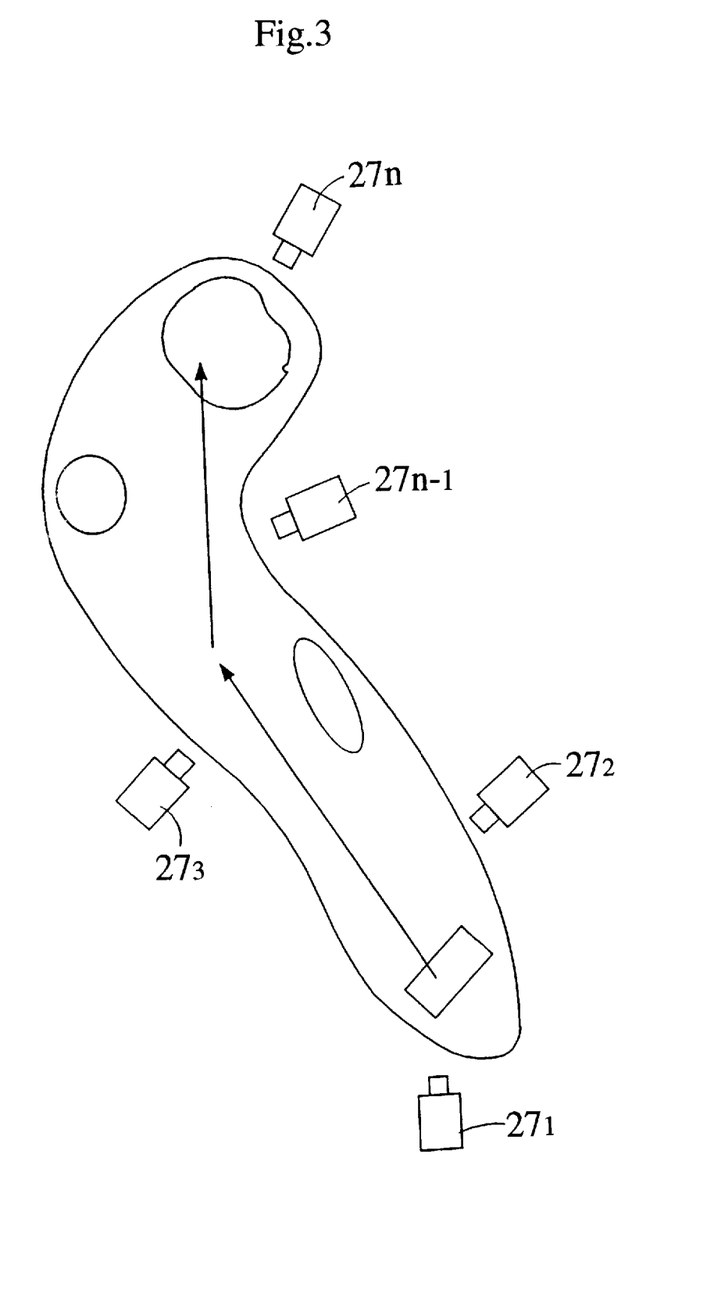
FIG. 3 is an explanatory drawing of disposition of imaging device of a communication system according to an embodiment of the present invention.
Figure 4:
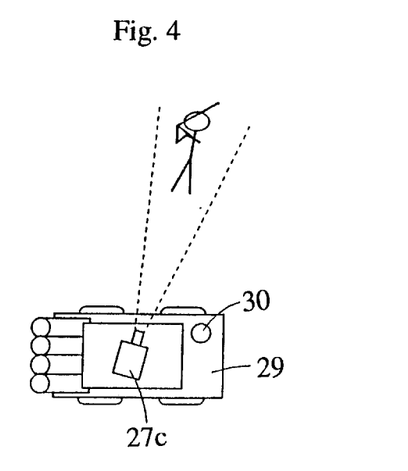
FIG. 4 is an explanatory drawing to show how an imaging device placed on a cart, is used.

As shown in FIG. 3, imaging devices $27_1$ to $27_n$ are placed around the perimeter of each hole. Further, as shown in FIG. 4, an on-vehicle imaging device $27_c$ may be placed atop a golf cart 29, in which case on-vehicle receiver 30 which receives control signals from camera controller component 26 is also placed atop a golf cart 29, imaging device $27_c$ being driven by on-vehicle receiver 30. Each imaging device $27_1 \sim 27_n$, $27_c$ is respectively provided with mechanisms to perform panning, tilting, as well as zooming, and may also be provided with auto-focus capability.

Selection of imaging devices $27_1 \sim 27_n$, $27_c$ as well as control of panning, tilting and zooming of the selected imaging devices $27_i$ is performed by imaging device controller component 26. However, on-vehicle camera $27_c$ need not be among any of said imaging devices $27_i$. Further, in cases where imaging devices are to be automatically selected, an imaging device $27_1 \sim 27_n$, $27_c$ nearest the subject to be imaged, for example, can be selected.

Figure 5:
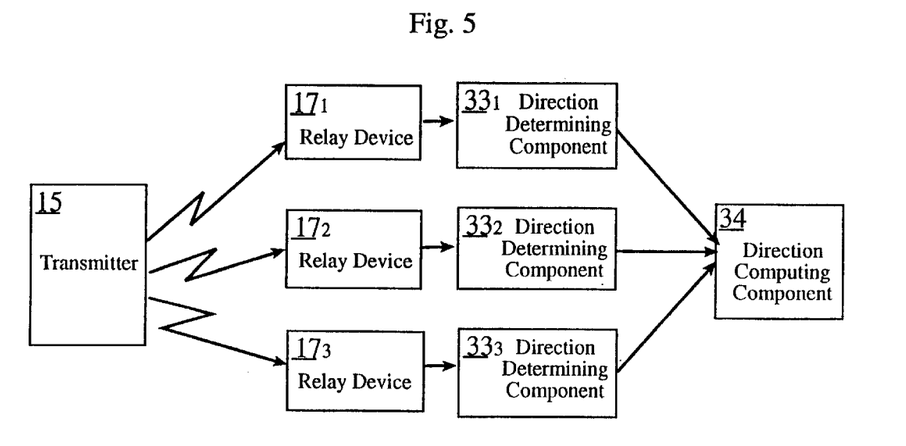
FIG. 5 is a block diagram illustrating the extraction of a location by means of a plurality of receiving devices of a communication system according to an embodiment of the present invention.

As shown in FIG. 5, a plurality of relay devices $17_1 \sim 17_n$ and direction determining components $33_1 \sim 33_n$ may be provided, relay devices $17_1 \sim 17_n$ being respectively provided with directional antennae and corresponding to said direction determining components $33_1 \sim 33_n$ so that the location of transmitter 15 may be detected by a location computing component 34 based on the direction determined by these direction determining components $33_1 \sim 33_n$. As to a number of relay devices $17_1 \sim 17_n$, at least two devices are needed to determine a direction and a distance by using the principle of triangulation.

Figure 10:
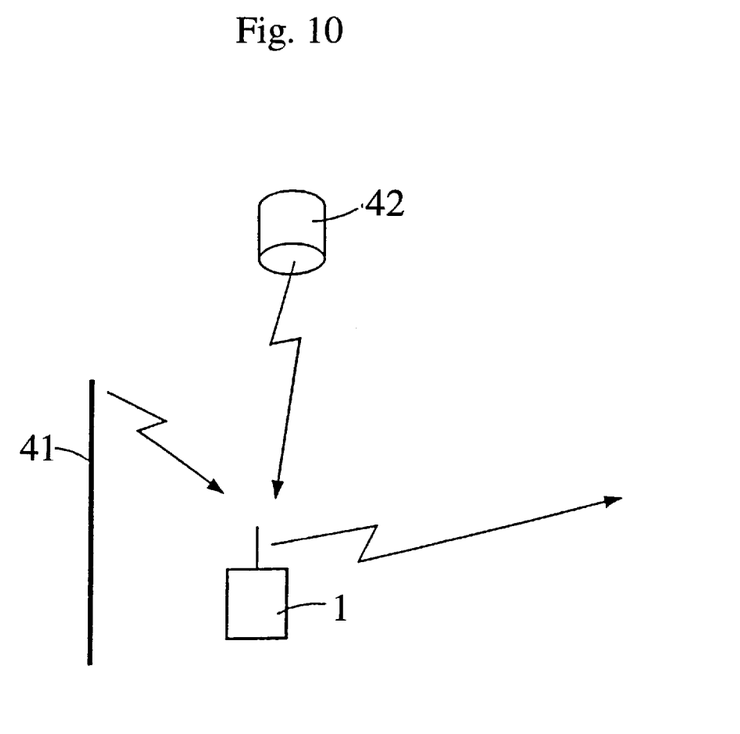
FIG. 10 is an explanatory drawing to illustrate the principle of location detection by means of GPS.

Next, referring to FIG. 10, another embodiment of the present invention is explained hereunder, said embodiment calling for detecting a location by means of mobile unit 1 itself and transmitting signals including the data for the location thus detected.

In this case, the direction and distance to mobile unit 1 from any of imaging devices $27_1 \sim 27_n$, $27_c$ can be determined by means of, for example, providing each hole with a plurality of antennae 41 which transmit reference radio waves; or as a second example providing mobile unit 1 with a navigation function such as GPS (Global Positioning System) which uses reference radio waves from a plurality of satellites 42. In these examples, mobile unit 1 converts the vectorial information of its location relative to each of reference antennae 41 or satellites 42, or a combination thereof, into location in terms of coordinates, such as latitude and longitude. Consequently, the direction and distance to mobile unit 1 from any one of imaging devices $27_1 \sim 27_n$, $27_c$ can be computed from the absolute coordinate locations of mobile unit 1 and the imaging device.

Figure 11:
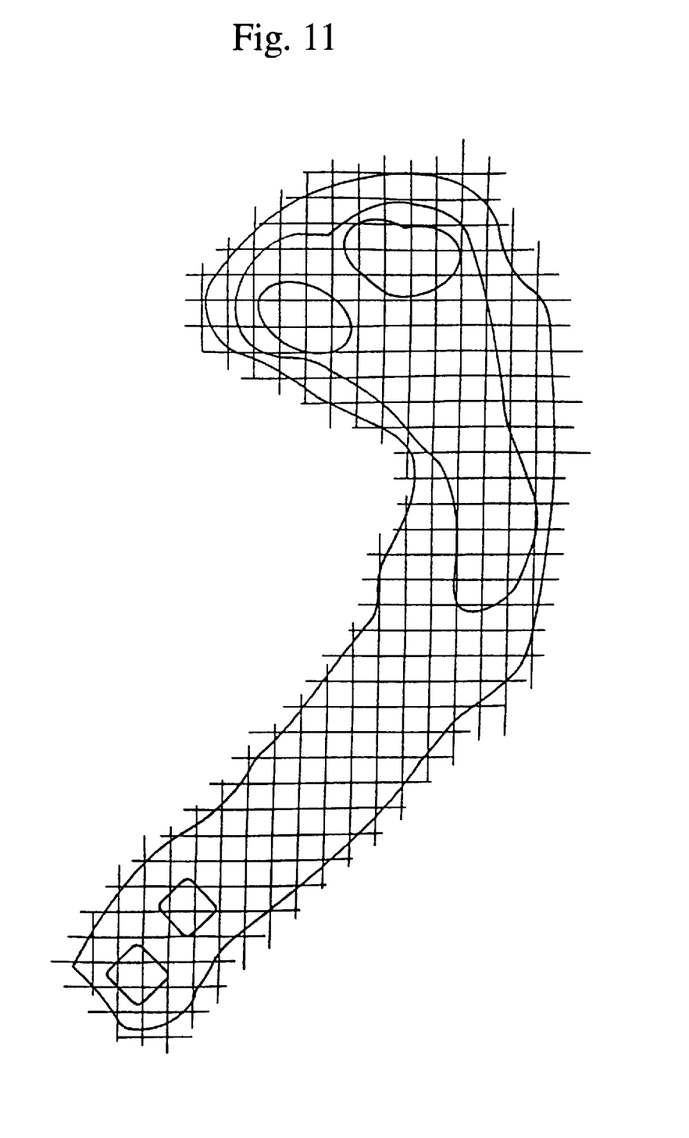
FIG. 11 is an explanatory drawing to illustrate a golf course divided into cells.

As shown in FIG. 11, the terrain of a hole or the entire course may be divided into cells in a matrix, each cell having its own ID number, so that the location of mobile unit 1 may be represented by a cell number. In cases where this cell system is applied, data of the respective directions and distances to the cells with respect to each imaging device $27_1 \sim 27_n$, $27_c$ may be stored beforehand so that the appropriate imaging device $27_1 \sim 27_n$, $27_c$ can be selected and controlled by directly using said data. Furthermore, the most suitable imaging device $27_1 \sim 27_n$, $27_c$ to be used for each cell may be included in the cell data to be stored. Cells are formed by dividing the entire course of the terrain from the tee ground to the green of each hole into small areas in a matrix which measures, for example, 3 meters on a side.

Operation of the above embodiments is described hereunder.

In case of an emergency such as when a player is seriously injured or collapses, by operation of emergency button 11 of mobile unit 1 by the player himself or a person accompanying him, mobile unit 1 transmits an emergency signal as well as a locational signal indicating its own location, as determined by the location determining component described for FIG. 10, above together with its ID data to receiver 21 of management unit 2.

Figure 6:
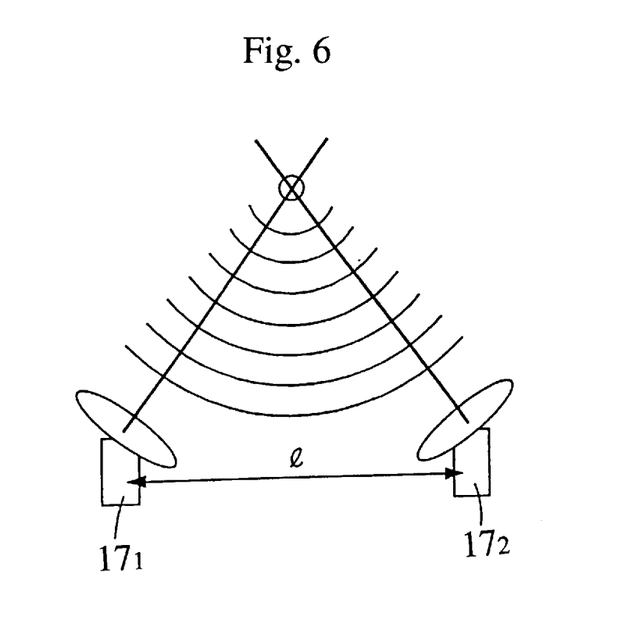
FIG. 6 is an explanatory drawing to further illustrate the principle triangulation range finding during the location extraction illustrated in FIG. 5.

Alternatively, the system may be configured such that the location of mobile unit 1 is computed by location computing component 34 shown in FIG. 5 and that signals including the locational signal indicating the location computed by this location computing component 34 are received by receiver 21. In this case, the location is determined based on signal receiving conditions of the plurality of relay devices $17_1 \sim 17_n$. In other words, as distance l between two relay devices $17_1$ and $17_2$ is constant as shown in FIG. 6, the location of transmitter 15 that transmitted the signals is determined by location computing component 34 by ascertaining the respective directions to transmitter 15 from relay devices $17_1$ and $17_2$, and the signals which include the locational signal indicating the current location of the specific transmitter 15 are transmitted to receiver 21.

As a result, according to the ID data included in the signals received by receiver 21, controller component 22 controls transmitter 23 to send signals to activate voice communication device 16 of mobile unit 1, thereby allowing voice communication between voice communication devices 16 and 24. A number of communication channels during normal circumstances can be reduced by preventing voice communication device 16 from being activated under normal circumstances and granting voice communication to only a specific mobile unit 1 in case of an emergency.

Based on the locational signal of receiver 21, camera controller component 26 of controller component 22 is controlled so that imaging device controller component 26 selects the most suitable camera $27_1 \sim 27_n$, $27_c$ according to the criteria set beforehand. Panning and tilting of imaging device $27_1 \sim 27_n$, $27_c$ selected by camera controller component 26 is controlled in order to adjust the angle of its view.

Figure 7:
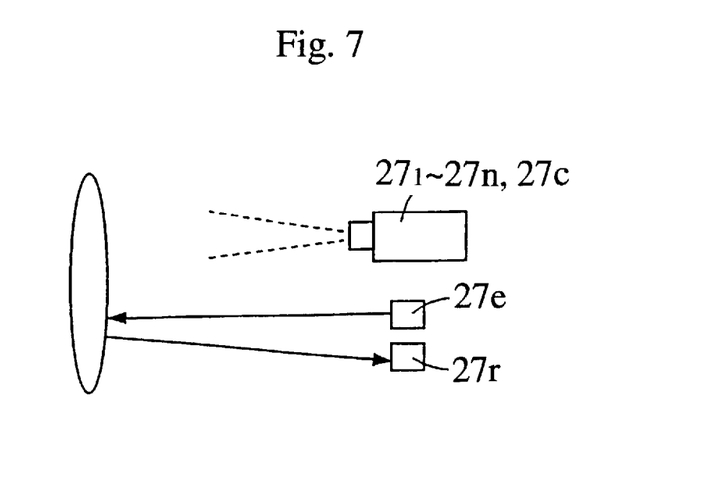
FIG. 7 is an explanatory drawing to illustrate range finding by an imaging device.

Selected imaging device $27_1 \sim 27_n$, $27_c$ determines the distance to the subject through control by camera controller component 26 or by automatic focusing using components incorporated in the camera itself, such as light emitting elements and photo-electric elements or, as shown in FIG. 7, an ultrasonic transmitter $27e$ and ultrasonic receiver $27r$, with automatic focusing being performed by emitting light or signals from the light emitting elements or ultrasonic transmitter $27e$ and computing the distance to the subject based on the length of time from when the light or the signals are emitted to when they are received by the photo-electric elements or ultrasonic receiver $27r$.

Figure 8:
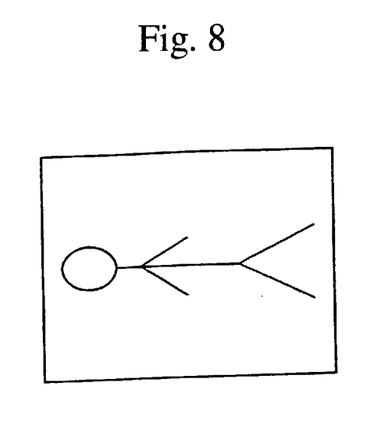
FIG. 8 is an explanatory drawing illustrating a properly framed subject.
Figure 9:
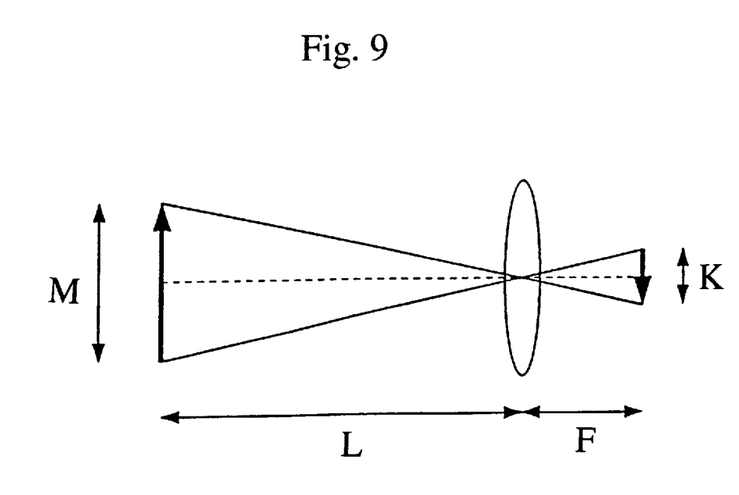
FIG. 9 is an explanatory drawing to illustrate the relationship between the distance and zooming with said imaging device.

At this time, imaging device $27_1 \sim 27_n$, $27_c$ is zoomed so that the proportion of the image of the subject in relation to the size of the frame is constant as shown in FIG. 8. In other words, when the distance from imaging device $27_1 \sim 27_n$ or $27_c$ to the subject is L, the height of the subject M, the focal length of the lens of the camera F, and the length of the image of the subject in the frame K as shown in FIG. 9, K is approximately equal to F×M/L, if value L is sufficiently large. Therefore, granting that M is the average height of an adult and constant, K can be made constant by changing focal length F according to distance L to transmitter 15 which has been measured.

The signals representing visual images of the person who is injured or ill, these pictures being taken by imaging devices $27_1$~$27_n$, $27_c$, are received by visual image receiver component 28. The visual signals and vocal signals, which have been received from voice communication device 16 through voice communication device 24, are transmitted by relay device 25 through public lines respectively to visual image receiver component 32 and voice communication device 31 of remote unit 3.

Further, where a doctor or other person using remote unit 3 wants specific pictures, the system may have such a configuration as to permit him to operate a dial or buttons or the like on voice communication device 31 to transmit DTMF signals through relay device 25 to the imaging device controller component 26 so that camera $27_1$~$27_n$, $27_c$ is selected and controlled to perform zooming, panning and tilting. This can be done by a setting such that, for example, pushing 2 causes upward tilting; pushing 8 downward tilting; pushing 4 panning to left; pushing 6 panning to right; pushing 1 zooming up; pushing 7 zooming down; and pushing * and the ID number of the desired camera when changing cameras.

The configuration as above facilitates looking at visual images of the patient on the course in favorable conditions by means of remote unit 3 installed in a hospital or the like and also provides communication with mobile unit 1 through telephone or other means which serves as voice communication device 31. As the invention thus makes it possible to know the conditions of the patient and give necessary directions for treatment of the patient and so forth, it has a merit in improving the effect of first aid treatment.

Further, as management unit 2 at a clubhouse can be connected to remote unit 3 at a hospital through public lines, installation of a system according to the invention is relatively easy.

Figure 12:
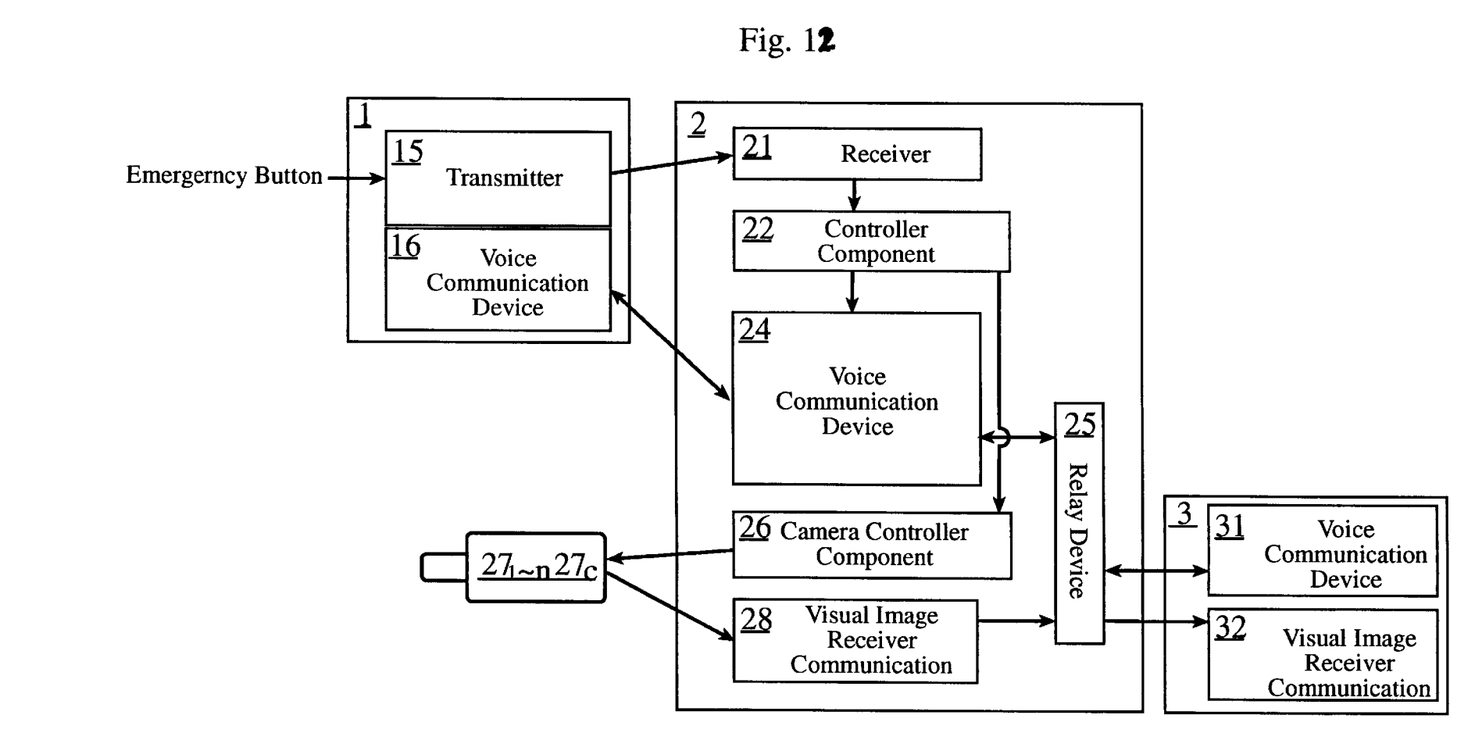
FIG. 12 is a block diagram illustrating a communication system according to another embodiment of the present invention.

Next, another embodiment is explained hereunder, referring to FIG. 12.

The embodiment shown in FIG. 12 is a simpler version of the embodiment shown in FIG. 1 and does not have receiver 23 of management unit 2. In this embodiment, communication between voice communication device 16 of mobile unit 1 and voice communication device 24 of management unit 2 is activated by operating emergency button 11.

Omitting receiver 23 makes necessary an increased number of channels in order to avoid radio interference. On the other hand, it is advantageous in providing immediate communication.

Figure 13:
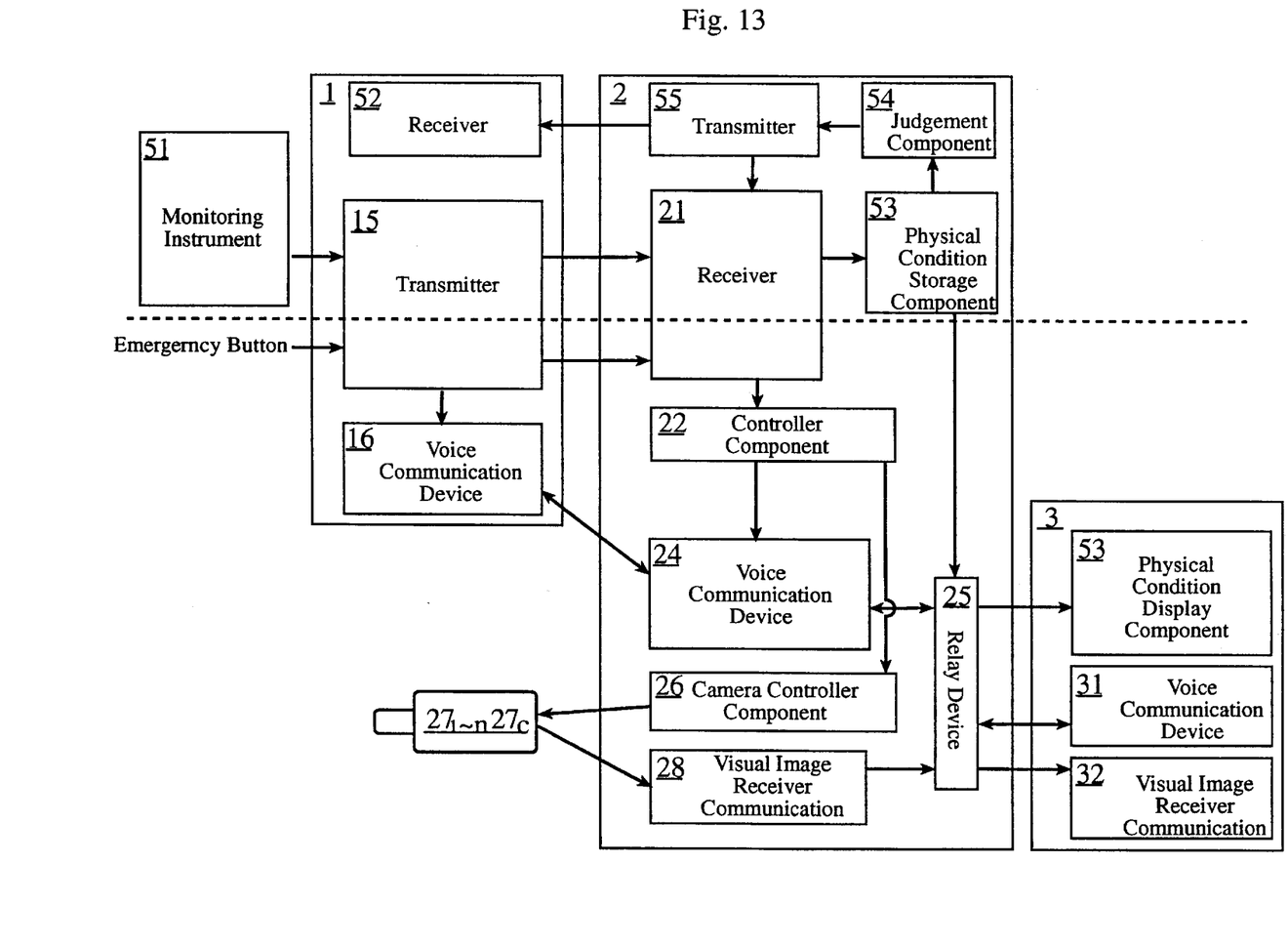
FIG. 13 is a block diagram illustrating a communication system according to yet another embodiment of the present invention.

Next, yet another embodiment is explained hereunder, referring to FIG. 13.

The embodiment shown in FIG. 13 has the same configuration as the embodiment shown in FIG. 12 except that it is capable of monitoring various physical conditions. Furthermore, a system having the configuration as the embodiment shown in FIG. 1 may also have a means of monitoring physical conditions.

According to the configuration of the embodiment, transmitter 15 of mobile unit 1 is capable of being connected to a monitoring instrument 51 for various physical conditions, such as body temperature, pulse, blood pressure and so on, through a wire circuit or wireless means.

Said monitoring instrument 51 may be of various types: for example, a constantly-worn type to be worn all the time, which may be in the shape similar to a wrist watch and measures body temperature, blood pressure, pulse and so on from the temperature of the surface of the body and blood vessels around the wrist by means of a thermometer, a pressure gauge, an infrared sensor or the like; an in-contact-when-necessary type to be brought into contact with a part of body, such as inside the mouth or an arm, to measure body temperature, blood pressure, pulse and so on by means of a thermometer, a pressure gauge, an infrared sensor or the like whenever necessary; and a fixed-installation type installed at a fixed location such as at a rest area in a clubhouse or a shop on the grounds of the course. Said fixed-installation type may have the configuration which calls for inputting the ID date of the user through his mobile unit 1 or other means, and setting a part of the user's body, such as an arm, on the equipment to obtain information of his physical condition. In cases where the constantly-worn type or the in-contact-when-necessary type is used, data of body conditions is detected near the user's mobile unit 1. Therefore, the data may be input into mobile unit 1 by connecting it to monitoring instrument 51 or, because they are at close range, through weak radio waves. In case of the fixed-installation type, data may be directly input to management unit 2 without going through mobile unit 1.

Furthermore, mobile unit 1 is provided with a receiver 52 for receiving signals which inform of abnormal physical conditions. Upon receiving such warning signals from management unit 2, receiver 52 gives warning by voice or sounding alarm, as well as displaying a message, such as "Body temperature is rising, presenting danger of heat stroke: Drink fluids and rest in a cool place", "Blood pressure above normal range: Stop game and return to clubhouse", "Irregular pulse: Stop game temporarily and rest at the nearest rest area for at least 30 minutes" or the like on liquid crystal display 5.

Management unit 2 is provided with a physical condition storage component 53 for storing data of physical condition monitored by monitoring instrument 51 and transmitted from mobile unit 1, physical condition storage component 53 storing transmitted data in the order of elapsed time from prior to starting the game and thereafter. Physical condition storage component 53 is also connected to relay device 25.

Physical condition storage component 53 is also connected to ajudging component 54 which judges whether abnormal physical conditions are being experienced by comparing current conditions with those stored in physical condition storage component 53. Further, judging component 54 is connected to a transmitter 55, which transmits warning signals to receiver 52 of mobile unit 1 when physical conditions of the subject is judged to be abnormal.

Remote unit 3 is provided with a physical condition display component 55 which has image composite function and is capable of generating composite images representing physical conditions of a patient on the display.

Next, operation of the above embodiments shown in FIG. 13 is described hereunder.

Its operational procedure is basically the same as that of the embodiment shown in FIG. 12.

First of all, store data of normal conditions of each player in physical condition storage component 53 beforehand by inputting it using keyboard 6 or assessing his physical conditions prior to starting the game by means of monitoring instrument 51.

Then, during the game, check physical condition at regular intervals or whenever desired by means of monitoring instrument 51. The data of this assessment is stored in physical condition storage component 53 in the order of elapsed time and also compared by judging component 54 with the data of the normal condition or the data of the condition before starting the game, which is also stored in physical condition storage component 53. In cases where any abnormal condition is detected in this judgement step, judging component 54 causes transmitter 55 to send out warning signals. When the warning signals have been transmitted, receiver 52 sounds an alarm and displays an appropriate message, such as those described above, on liquid crystal display 5.

When emergency button 11 is activated, in addition to sound signals and visual signals of pictures taken by one of imaging devices $27_1$~$27_n$, $27_c$, data of physical conditions of the subject stored in physical condition storage component 53 is transmitted through relay device 25 to remote unit 3.

In remote unit 3, the physical condition data stored in physical condition storage component 53 is combined with pictures taken by imaging device $27_1$~$27_n$, $27_c$ and displayed in the form of composite image. Physical condition data to be displayed includes data of normal condition, physical condition before starting the game and those obtained by assessment after starting the game, as well as the current condition. As these physical conditions are displayed in the order of elapsed time, with the changes of physical condition and the current state being thus presented, the changes in the condition of the patient can be reliably known.

Furthermore, the patient's chronic illness, allergies, current medication and other data may be stored in physical condition storage component 53 beforehand using ten-key pad 6 of mobile unit 1 or other means.

As it is possible to know about the physical condition of the person who has been injured or fallen ill, following the flow of time and in real time according to this embodiment shown in FIG. 13, the embodiment ensures of giving appropriate care in an emergency and effective early-stage treatment.

Furthermore, the term "sender" referred to in the above explanation and appended claims, whose pictures are being taken, is not limited to the person who actually sends signals; it may also mean the injured or the sick person, who is at a location near the actual sender and whose physical conditions are monitored.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A communication method comprising the steps of:
transmitting signals from a sender by means of a mobile unit carried by said sender, said signals having a vocal and an informational component;
receiving said signals from said sender at a relay station;
selecting a selected imaging device from a plurality of imaging devices located at various positions of an area;
obtaining a visual image of said sender, said obtaining a visual image including controlling a plurality of imaging functions of said selected imaging device;
transmitting further signals from said sender together with said visual image from said relay station to a receiving party; and
transmitting vocal signals of said receiving party through said relay station to said sender responsively to at least one of said further signals and said visual image.

2. The communication method of claim 1, wherein:
said informational component includes locational data for said sender's location;
said selecting a selected imaging device is responsive to said locational data; and
said controlling said plurality of imaging functions of said imaging device is responsive to said locational data.

3. The communication method of claim 2, wherein:
said selecting a selected imaging device includes one of automatically selecting at said relay station and manually selecting by said receiving party; and
said controlling said plurality of imaging functions includes one of automatically controlling at said relay station and manually controlling by said receiving party.

4. The communication method of claim 3, wherein said transmitting said informational component of said signals from said sender includes transmitting a physical condition datum of a subject.

5. The communication method of claim 4, wherein said transmitting a physical condition datum includes the steps of:
monitoring a physical condition of said subject to produce a present physical condition datum;
providing a stored normal physical condition datum of said subject; and
correlatively transmitting said stored normal physical condition datum and said present physical condition datum.

6. A communication system comprising:
at least one imaging device;
at least one mobile unit having means for transmitting and receiving vocal and informational signals;
at least one remote unit having means for transmitting and receiving said vocal and informational signals;
said at least one remote unit having means for receiving visual signals
said at least one remote unit having means for displaying visual images responsively to said visual signals;
a management unit having means for individually controlling imaging functions of each of said at least one imaging device;
said management unit having a means for relaying said vocal, said visual, and said informational signals between each said at least one mobile unit means for transmitting and receiving and each said at least one remote unit means for transmitting and receiving; and
said management unit having means for concurrently receiving said visual signals from said at least one imaging device with said signals from said at least one mobile unit, and concurrently transmitting said visual signals from said at least one imaging device with said signals from said at least one mobile unit to said at least one remote unit.

7. The communication system of claim 6, wherein said at least one remote unit has an override means for individually controlling imaging functions of each of said at least one imaging device.

8. The communication system of claim 7, further comprising:
means for monitoring a physical condition of a subject, said means for monitoring having physical condition output data;
means for sending said physical condition output data to said mobile unit; and said informational signals including said physical condition output data.

9. The communication system of claim 8, further comprising:
   means for storing data of a normal physical condition of said subject; and
   means for combining said normal physical condition data of said subject and said physical condition output data of said subject to form composite physical condition data;
   said informational signals including said composite physical condition data.

10. The communication system of claim 9, further comprising:
    means for combining visual images of said subject taken by said at least one imaging device with said output data of said subject's means for monitoring physical condition.

11. The communication system of claim 6, further comprising:
    means for locating said at least one mobile unit; means for extracting locational data from said means for locating;
    means for sending said locational data extracted by said means for extracting to said management unit;
    said management unit having means for selecting said at least one imaging device responsive to said locational information received from said means for locating; and
    said means for individually controlling controls said at least one imaging device selected by said means for selecting responsively to said locational information received from said means for locating.

12. The communication system of claim 7, further comprising:
    means for locating said at least one mobile unit;
    means for extracting locational data from said means for locating;
    means for sending said locational data extracted by said means for extracting to said management unit;
    said management unit having means for selecting said at least one imaging device responsive to said locational information received from said means for locating; and
    said means for individually controlling controls said at least one imaging device selected by said means for selecting responsively to said locational information received from said means for locating.

13. The communication system of claim 8, further comprising:
    means for locating said at least one mobile unit;
    means for extracting locational data from said means for locating;
    means for sending said locational data extracted by said means for extracting to said management unit;
    said management unit having means for selecting said at least one imaging device responsive to said locational information received from said means for locating; and
    said means for individually controlling controls said at least one imaging device selected by said means for selecting responsively to said locational information received from said means for locating.

14. The communication system of claim 9, further comprising:
    means for locating said at least one mobile unit;
    means for extracting locational data from said means for locating;
    means for sending said locational data extracted by said means for extracting to said management unit;
    said management unit having means for selecting said at least one imaging device responsive to said locational information received from said means for locating; and
    said means for individually controlling controls said at least one imaging device selected by said means for selecting responsively to said locational information received from said means for locating.

15. The communication system of claim 10, further comprising:
    means for locating said at least one mobile unit;
    means for extracting locational data from said means for locating;
    means for sending said locational data extracted by said means for extracting to said management unit;
    said management unit having means for selecting said at least one imaging device responsive to said locational information received from said means for locating; and
    said means for individually controlling controls said at least one imaging device selected by said means for selecting responsively to said locational information received from said means for locating.

* * * * *